J. RADDIN.
Railway Car Wheel.
No. 85,693.
Patented Jan'y 5, 1869.
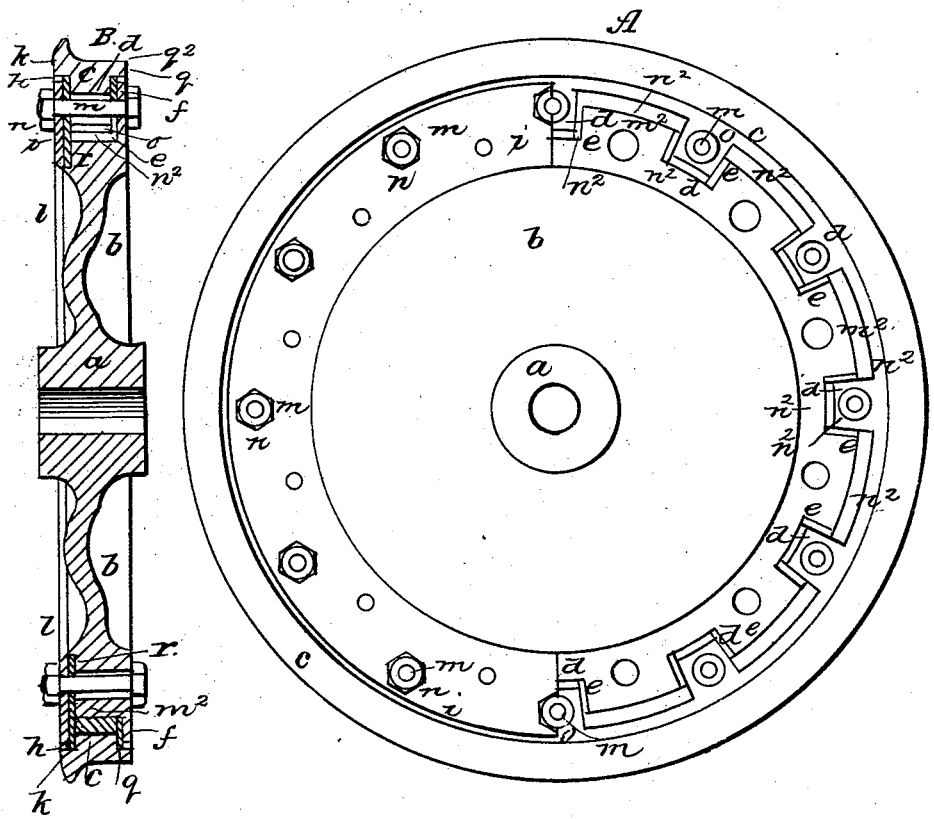
Witnesses:
L. B. Kidder
M. W. Frothingham
Inventor:
John Raddin
by his Atty
Crosby, Halsted & Gould

UNITED STATES PATENT OFFICE.

JOHN RADDIN, OF LYNN, MASSACHUSETTS.

IMPROVED CAR-WHEEL FOR RAILWAYS.

Specification forming part of Letters Patent No. 85,693, dated January 5, 1869.

*To all whom it may concern:*

Be it known that I, JOHN RADDIN, of Lynn, in the county of Essex and State of Massachusetts, have invented an Improvement in Railway-Car Wheels; and I do hereby declare that the following, taken in connection with the drawings which accompany and form part of this specification, is a description of my invention sufficient to enable those skilled in the art to practice it.

My invention relates to the construction of railway-car wheels with particular reference to the interposition of elastic bearing-surfaces between the hub and tire, and to such construction of such an elastic wheel as shall prevent the wheel from being weakened or rendered less safe by reason of the construction which renders it elastic.

The invention consists, primarily, in casting the tire (which is formed separately from the hub) with a series of inwardly-projecting teeth, which teeth correspond in number and general form with a series of recesses formed in the hub, the inward projections of the tire and the outward projections of the hub being preferably dovetailing in form, and the space around the edge of each being filled with rubber or other elastic material, so that the metal of the tire may not come into contact with the metal of the hub in the strain of one part upon the other, produced by the rotation of the wheel and the friction of the wheel upon the rail and the weight upon the wheel.

The drawing represents a wheel embodying my improvement.

A shows a side view of the wheel, one-half of the movable ring, which is bolted upon one side, being taken away. B is a section on the line $x\,x$.

$a$ denotes the hub, which is cast with a web, $b$, connecting it with the tire $c$. The tire $c$ is formed with the short teeth or cogs $d$, projecting radially from its inner surface, as seen at A, and the hub is formed with the series of recesses $e$, into which the cogs $d$ extend.

One face of the hub or web $b$ has a flange, $f$, cast integral with it, this flange extending outwardly beyond the cogs $d$, and being surrounded by a peripheral lip, $g$, cast with the tire, this flange $f$ covering the cogs or teeth and the recesses on one side of the wheel.

In connecting the tire and hub, the hub is laid with this flanged side downward, and the tire is placed upon it, each tooth $d$ of the tire entering a recess, $f$, in the perimeter of the hub.

When the hub and tire are thus brought together a recess, $h$, is formed on the inner surface of the wheel, into which recess a confining-ring, $i$, is placed, (the edges of said ring being bounded by the lips $k$ and $l$,) this ring covering the teeth and recesses on the inner side of the wheel, said ring being bolted to the flange $f$, as seen at B, by a series of screw-bolts, $m$, and nuts $n$.

Each tooth $d$ is smaller than the recess that it enters, there being a space adjacent to each edge of it and at its end, and there is also a space beyond each projecting part $m^2$ (between the recesses $e$) and the tire. Each of these spaces is filled with an elastic cushion or packing, $n^2$, preferably of caoutchouc or of a caoutchouc compound.

Each bolt $m$ passes through a hole, $o$, in the tire, larger in diameter than itself, so that, relatively to the bolts, the tire may play laterally, and the bearing and strain of the tire and of the hub are wholly upon the cushions placed between them, and not upon the bolts, and will be distributed among these cushions, as will be readily understood.

Now, if any bolt or any part of the tire should break, it will be seen that the wheel is still safe, as the dovetailing form of the teeth (or of consecutive teeth, taken together) will hold parts of the tire as well as the whole to the hub.

Two series of bolts may be used, the bolts of the second series passing through holes $p$ in the hub; but I consider the outer series sufficient.

Between the inner surface of the flange $f$ and the adjacent surface of the tire an elastic ring, $q$, may be placed, and between the surface of the ring $i$ and the adjacent surface of the hub and tire an elastic ring, $r$, may be interposed, these two rings cushioning the wheel laterally, and diminishing lateral strain upon the hub, as will be readily understood.

It will be seen that throughout the rotation of the wheel the metal of the tire is separated from the metal of the hub by the elastic cushioning-blocks $n^2$, and that the tire cannot under any circumstances slip or slide around upon the hub, the interlocking teeth preventing relative rotation or slipping movement.

It will also be seen that no strain comes upon the bolts, their office being merely to hold the tire and hub interlocked.

I claim—

1. A car-wheel the tire of which has teeth or projections entering recesses in the perimeter of the hub or web portion of the wheel, or vice versa, elastic blocks or cushions being interposed, substantially as described.

2. I also claim, in combination with a wheel having such interlocking teeth, the flange $f$, integral with the hub and the ring $i$, such flange and ring being connected by the screw bolts and nuts, substantially as shown and described.

3. I also claim, in combination with a metal wheel whose hub and tire are formed separate and fastened together by bolts, the arrangement of the bolts to pass through projections from either part of the wheel, the projections having holes therein larger than the bolts, so that, if any relative movement takes place between the hub and the tire, the strain and wear come upon such projections and not upon the bolts.

JOHN RADDIN.

Witnesses:
 J. B. CROSBY,
 FRANCIS GOULD.